US008084968B2

(12) United States Patent
Murray et al.

(10) Patent No.: US 8,084,968 B2
(45) Date of Patent: Dec. 27, 2011

(54) USE OF AN ACCELEROMETER TO CONTROL VIBRATOR PERFORMANCE

(75) Inventors: Matthew J. Murray, Raleigh, NC (US); William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 381 days.

(21) Appl. No.: 11/856,173

(22) Filed: Sep. 17, 2007

(65) Prior Publication Data

US 2009/0072768 A1    Mar. 19, 2009

(51) Int. Cl.
*H02P 1/00* (2006.01)
(52) U.S. Cl. .................................. 318/114; 318/461
(58) Field of Classification Search .............. 318/461, 318/114, 600
See application file for complete search history.

(56) References Cited

U.S. PATENT DOCUMENTS

| | | | | |
|---|---|---|---|---|
| 5,436,622 | A * | 7/1995 | Gutman et al. | 340/7.6 |
| 6,489,950 | B1 * | 12/2002 | Griffin et al. | 345/168 |
| 6,774,769 | B2 * | 8/2004 | Okada | 340/407.1 |
| 7,019,622 | B2 * | 3/2006 | Orr et al. | 340/407.1 |
| 2002/0177419 | A1 | 11/2002 | Hwang | |
| 2006/0172706 | A1 * | 8/2006 | Griffin et al. | 455/67.11 |
| 2007/0032270 | A1 * | 2/2007 | Orr | 455/567 |

FOREIGN PATENT DOCUMENTS

| | | |
|---|---|---|
| EP | 1686776 | 8/2006 |
| JP | 2006079191 | 3/2006 |
| WO | 91/20136 | 12/1991 |

OTHER PUBLICATIONS

Translation of Japanese document JP 2006-079191, Industrial Property Digital Library, pp. 1-13, Aug. 24, 2010.*
International Search Report, corresponding to International Patent Application No. PCT/US2008/070110, dated Nov. 10, 2008.
Written Opinion, corresponding to International Patent Application No. PCT/US2008/070110, dated Nov. 10, 2008.
International Preliminary Report on Patentability, corresponding to International Patent Application No. PCT/US2008/070110, dated Sep. 1, 2009.
State Intellectual Property Office of China; First Office Action; Feb. 24, 2011; issued in Chinese Patent Application No. 200880107311.0.

* cited by examiner

*Primary Examiner* — Rina Duda
(74) *Attorney, Agent, or Firm* — Sreenivas Vedantam; Moore & Van Allen, PLLC

(57) ABSTRACT

A mobile device includes a vibrator, an accelerometer that senses a parameter of rotation, and a processor. The vibrator includes a drive motor and a drive circuit. The accelerometer senses a speed of rotation of the vibrator. The processor analyzes the sensed speed of rotation and generates a drive voltage that is received by the drive circuit to adjust the drive motor to produce a pre-determined, desired rotational speed. In another embodiment, the accelerometer senses an amplitude of a vibration produced by the vibrator. The processor analyzes the sensed amplitude of a vibration and generates a drive voltage that is received by the drive circuit to adjust the drive motor to produce a pre-determined, desired vibration amplitude. The processor may also compare the sensed parameter with a pre-determined desired parameter of rotation and generate a signal responsive to a result of the comparison and based on stored vibrator calibration curves.

15 Claims, 6 Drawing Sheets

USE OF AN ACCELEROMETER TO CONTROL VIBRATOR PERFORMANCE

BACKGROUND OF THE INVENTION

The present invention is related to controlling a vibrator in a mobile phone, and more specifically to use of an accelerometer to control vibrator performance.

Mobile phones generally have a means of informing the user to incoming calls via silent alerting, e.g., vibrating. This is helpful in instances where an alerting sound is inappropriate or where an alerting sound is not adequate. Thus, tactile sensation can be used to make the mobile user aware of calls or other events, such as alarms, calendar reminders, etc.

Many mobile phones use eccentric mass vibrator motors for silent alerting. Eccentric mass vibrator motors tend to be driven at a single direct current (DC) voltage in mobile phone handsets. This voltage is one of the main factors that determines the vibrator motor's rotational speed. Internal variation in the vibrator may cause the speed of one motor (at the phone's drive voltage) to rotate at a different speed than another vibrator from the same manufacturer. In addition, as eccentric mass vibrators are used they wear which causes the motors to speed up beyond their original functional speed.

Humans are sensitive to different frequency ranges of vibration. Acceleration increases as rotational speed increases. However, beyond a certain rotational speed, the human perception of vibration begins to diminish. Thus, if a target rotational speed can be identified for a given vibrator/phone implementation such that this speed maximizes tactile sensation, it would be optimum if the vibrator motor always functioned at this rotational speed.

BRIEF SUMMARY OF THE INVENTION

Embodiments of the present invention are related to a mobile device that includes a vibrator, the vibrator including a drive motor and a drive circuit, an accelerometer, the accelerometer sensing a speed of rotation of the vibrator; and a processor, the processor analyzing the sensed speed of rotation and generating a drive voltage that is received by the drive circuit to adjust the drive motor to produce a pre-determined, desired rotational speed.

Embodiments of the present invention are also related to a method for controlling a vibrator in a mobile device that includes sensing a speed of rotation of a vibrator, and generating a signal to control the vibrator to produce a pre-determined desired rotational speed responsive to the sensed speed of rotation.

Embodiments of the present invention are further related to a mobile device that includes a vibrator, the vibrator including a drive motor and a drive circuit, a sensor, the sensor sensing a parameter of rotation of the vibrator, and a processor, the processor analyzing the sensed parameter of rotation and generating a signal that is received by the drive circuit to adjust the drive motor to produce a pre-determined, desired parameter of rotation.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
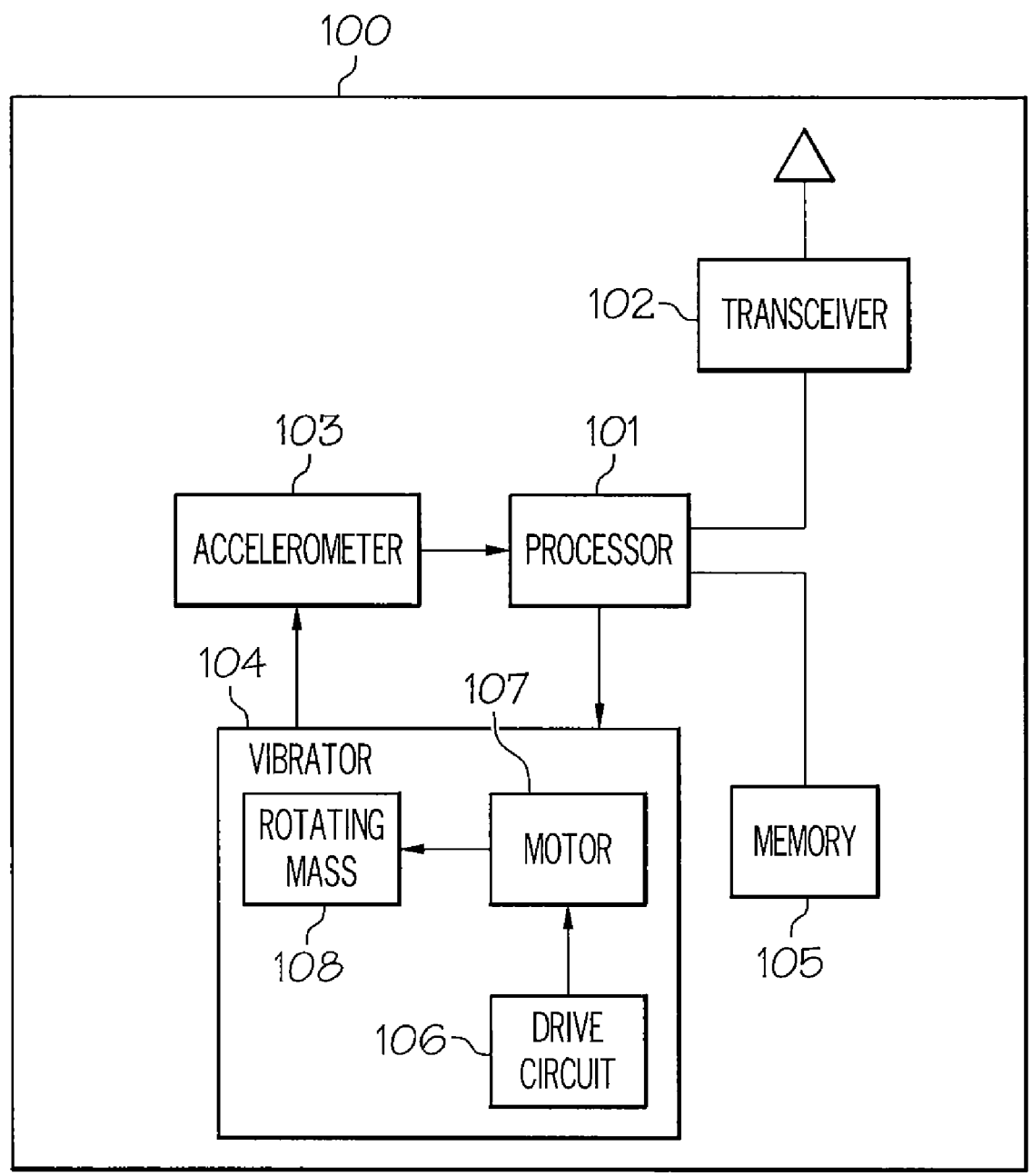
FIG. 1 is a diagram of a mobile device according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention control vibration motor characteristics using a sensor. To illustrate embodiments of the present invention, the sensor is an accelerometer, however, embodiments of the present invention are not limited by the use of an accelerometer as any type sensor that monitors the speed of rotation and/or an amplitude of a vibration signal is within the scope of the present invention. An accelerometer may be used to control the speed and/or amplitude of a vibration generator. The rotational speed of a vibrator may be sensed with the onboard accelerometer and, in response, an optimum drive voltage may be determined and fed back to a vibrator driver circuit in the accelerometer thus causing the vibration motor to produce a pre-determined optimum rotational speed. In other embodiments, an amplitude of a vibration signal of the vibrator may be sensed with the accelerometer and, in response, an optimum drive voltage may be determined and fed back to a vibrator driver circuit in the accelerometer thus causing the vibration motor to produce a pre-determined optimum amplitude. Generally, DC-motors increase in speed as the DC drive voltage supplied to them is increased.

Embodiments according to the present invention may also be viable for use with linear travel vibrator transducers and multi-mode actuators. These devices can often be driven with a known frequency. However, their transducer sensitivity may vary based on the internal efficiency of their coil windings and magnetic motor. Thus, different vibration levels may be achieved with different samples of a given transducer. In a given phone design, there may be a maximum vibration level that is desired in a set of phone mechanics. Going beyond this level may increase sensation but also cause audible rattles and buzzes from associated phone mechanics. In certain cases, if the vibration transducer is in close proximity to electrical contacts or vibration sensitive components, there may be a maximum vibration level imposed by these constituent parts as well. In contrast, being too far below the maximum vibration limit may reduce the effectiveness of the vibration transducer.

Therefore, in embodiments according to the present invention, when the limit of acceptable vibration is known in a handset, the use of an accelerometer to provide vibration feedback information to the vibration driver may be used to adjust each phone/motor combination independently. This adjustment may be used to help with operating the motor/vibration transducer at the maximum allowable vibration without exceeding predetermined vibration levels.

According to embodiments of the present invention, vibrators that are driven by either DC (direct current) voltages or AC (alternating current) voltages may be monitored. An associated vibration frequency and/or amplitude of vibration of a vibrator may be monitored and controlled according to a desired frequency of vibration or amplitude of vibration signal. If the vibrator uses DC voltage to control the frequency of vibration, a DC voltage may be supplied to the vibrator to control the frequency of vibration (speed of rotation).

If a vibrator is driven by an AC signal to control the frequency of vibration, the frequency is typically known based on the frequency of the AC signal used to drive the vibrator. Therefore, according to embodiments of the present invention, an accelerometer may be used to control an amplitude of the vibration signal where the accelerometer may monitor an amplitude of the vibration signal and supply appropriate AC voltages to a vibrator to ensure that the amplitude of a vibration signal generated by the vibrator is maintained at a desired amplitude.

FIG. 1 shows a diagram of a mobile device according to an example embodiment of the present invention. The mobile device 100 may include a processor 101 interconnected to a transceiver 102 for transmitting and receiving information. The information may be text data, audio, video, other type data or a combination thereof. The processor 101 may also be connected to an accelerometer 103, a vibrator 104, and one or more memory devices 105. The vibrator may include a drive circuit 106, a drive motor 107, and a rotating mass 108. The processor 101 may receive information via the transceiver 102 that may require a vibration to be generated from the vibrator 104 (e.g., incoming call, incoming page, etc.). The processor may then send a drive signal to the drive circuit 106 in the vibrator 104 to cause the vibrator 104 to generate a vibration. Further, the processor may alternatively receive a signal from the accelerometer 103 that, in combination with some programming logic, results in a controlled voltage being sent to the drive circuit 106 in the vibrator 104 to cause the vibrator 104 to vibrate at a specific speed of rotation or a specific frequency. Since speed of rotation and frequency are interchangeable, either term may be used throughout the present disclosure. While not shown, in instances where the drive motor 107 is an AC-driven motor, there may be a frequency generator and associated components for driving the AC-driven motor at a desired frequency.

As discussed above, embodiments of the present invention include a sensor associated with the vibrator for sensing operation of the vibrator. For illustration purposes, the sensor 103 is shown as an accelerometer for sensing vibration signals generated by the vibrator 104. The sensor 103 provides feedback regarding operation of the vibrator 104, and in particular, detects a level related to a vibration output by the vibrator 104. Either or both the frequency of vibration or amplitude of vibration may be monitored. Typically, where the vibrator 104 is driven by a DC motor, the sensed vibration signal may be analyzed for vibration frequency, and where the vibrator 104 is driven by an AC motor, the sensed vibration signal may be analyzed for the amplitude of the vibration signal.

In the illustrated embodiment, the output of the sensor 103, in this case an accelerometer, is provided to the processor 101 for analysis and use in providing an appropriate drive signal (selected voltage or frequency) to the drive circuit 106 of the vibrator 104. In some embodiments, the processor 101 may use stored threshold values for vibration frequency and/or vibration amplitude. The processor 101 may compare the vibration signal to one or both of these threshold values and adjust the output to the drive circuit 106 accordingly. In other embodiments of the present invention, the processor 101 may use vibrator calibration curves stored in the memory 105 to determine what voltage or frequency the accelerometer 103 may need to generate to achieve a desired vibration signal from the vibrator 104.

The vibrator calibration curves may be a single curve or multiple curves and may be established during or after manufacture of the vibrator. Further, the curves may be determined with the vibrator installed or not installed in a mobile device 100. The accelerometer 103 may monitor and sense a speed of rotation of the vibrator 104 and supply this sensed speed of rotation to the processor 101. The processor 101 may then compare the sensed speed received from the accelerometer 103 with a desired speed. The desired speed may be preset or may be dynamically inputted into the processor 101. Further, the desired speed, as noted previously, may be retrieved from vibrator calibration curves stored in a memory 105. Depending on the result of the comparison, the processor 101 may generate and send appropriate voltage levels to the drive circuit 106 to control the vibrator 104 to produce a desired speed of rotation of the drive motor 107 (i.e., associated with the desired vibration frequency).

Therefore, as a vibrator ages and undergoes burn-in, any fluctuations in a desired vibration frequency may be immediately corrected and adjusted in order to maintain a desired vibration frequency (i.e., speed of rotation). The processor 101, after receiving the sensed speed of rotation of the vibrator 104 from the accelerometer 103, may also generate or update the stored vibrator calibration curves. Therefore, the vibration calibration curves may be kept updated based on knowing what past voltage levels supplied to the vibrator 104 produced what speeds of rotation or vibration frequencies.

Figure 2:
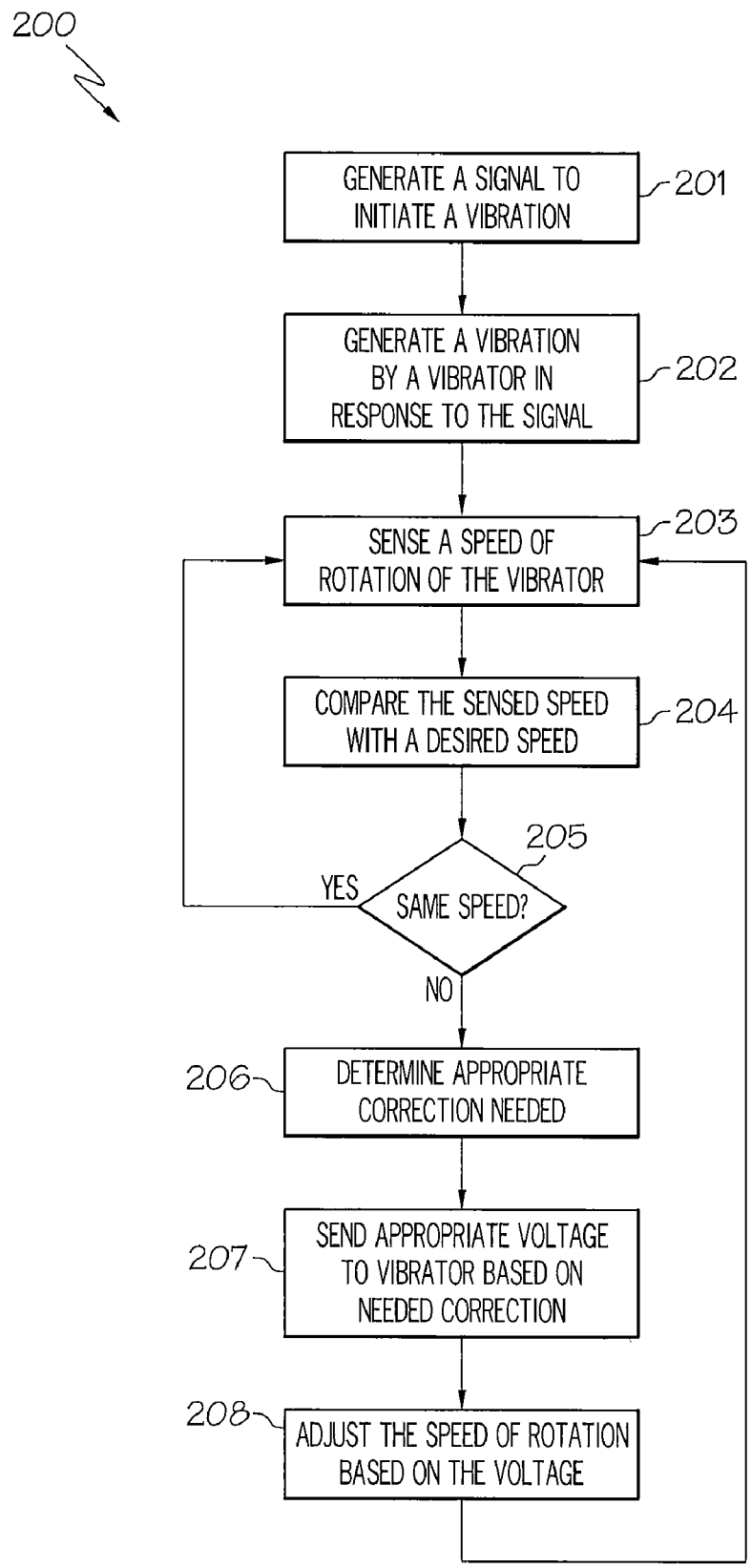
FIG. 2 is a flowchart of a process for controlling a vibrator according to an example embodiment of the present invention.

FIG. 2 shows a flowchart of a process for controlling a vibrator according to an example embodiment of the present invention. In the process 200, in block 201, a signal may be generated to initiate a vibration. In block 202, a vibration may be generated by a vibrator in response to the signal. In block 203, a speed of rotation of the vibrator (or frequency of vibration) may be sensed. In block 204, the sensed speed maybe compared with a desired speed. In block 205, it may be determined whether the sensed speed is the same as a desired speed, and if so, the process returns to block 203 where the speed of rotation of the vibrator is sensed. If the sensed speed is not the same as the desired speed based on the comparison in block 205, in block 206, it may be determined what appropriate correction is needed to obtain the desired speed. In this regard, it may be determined how far away, plus or minus, the sensed speed is from the desired speed and what voltage level may be needed to be sent to the vibrator to cause the vibrator to produce a sensed speed value that is the same as the desired speed. In block 207, an appropriate voltage may be sent to the vibrator based on the determined needed correction. In block 208, the speed of rotation (frequency of vibration) may be adjusted based on the voltage received and the process return to block 203, where the speed of rotation of the vibrator is sensed.

Figure 3:
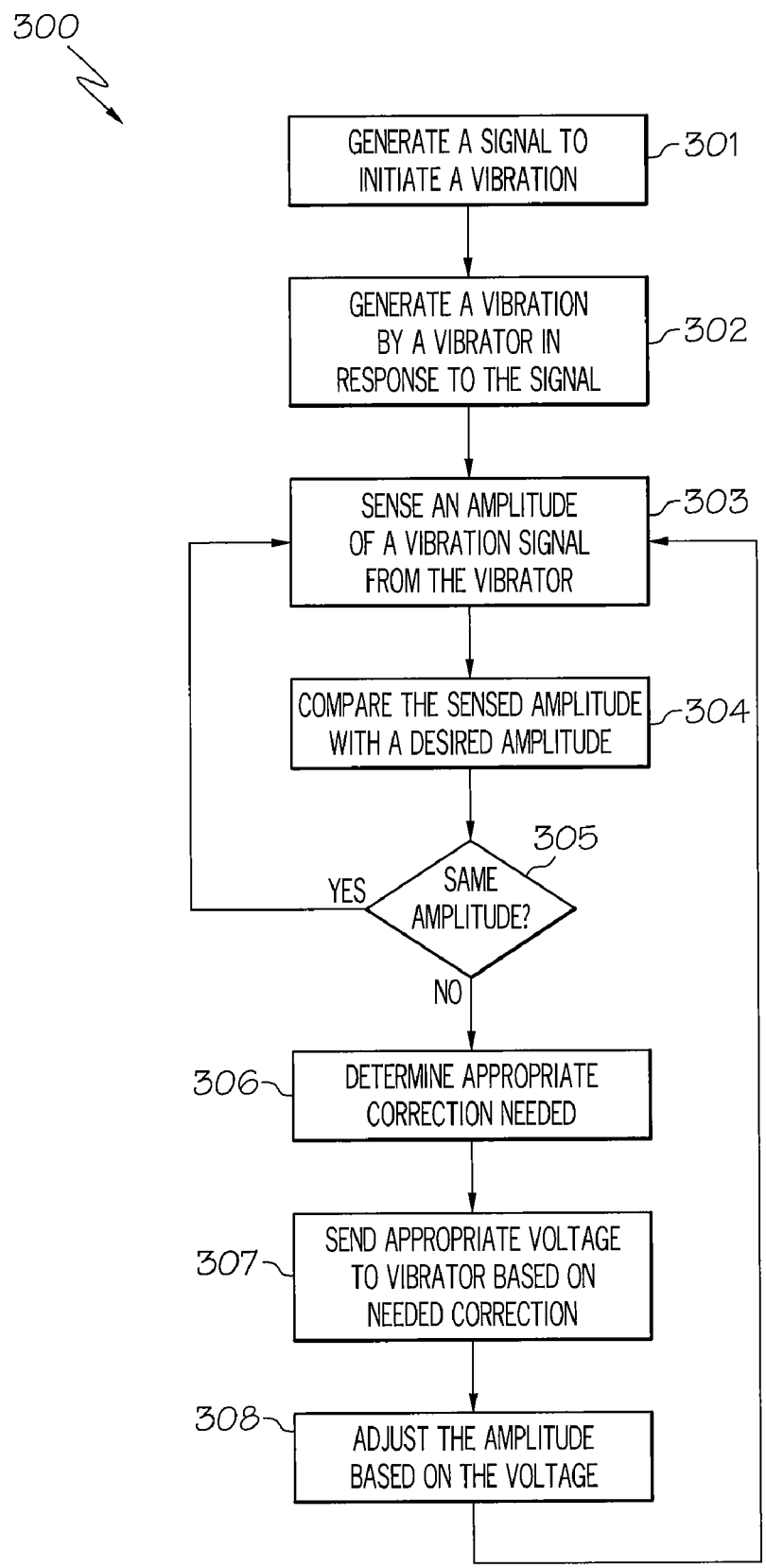
FIG. 3 is a flowchart of a process for controlling a vibrator according to another example embodiment of the present invention.

FIG. 3 shows a flowchart of a process for controlling a vibrator according to another example embodiment of the present invention. In the process 300, in block 301, a signal to initiate a vibration may be generated. In this regard, an incoming call may be received, a pager may receive an incoming call, a reminder regarding a calendar/schedule entry, etc. that requires a vibration to be generated from the vibrator to alert a user or holder of the mobile device of the received communication. In block 302, a vibration may be generated by a vibrator in response to the signal. In block 303, an amplitude of a vibration from the vibrator may be sensed. In block 304, the sensed amplitude may be compared with a desired amplitude. In block 305, it may be determined whether the sensed amplitude is the same as the desired amplitude, and if so, the process returns to block 303 where an amplitude of a vibration of the vibrator may be again sensed. If the sensed amplitude is not the same as the desired amplitude as determined in block 305, in block 306, it may be determined what appropriate correction is needed. In this regard, it may be determined how far away, plus or minus, the sensed amplitude is from the desired amplitude and what voltage level may be needed to bring the sensed amplitude value to the desired amplitude. In block 307, an appropriate voltage may be sent to the vibrator based on the determined needed correction. In block 308, the amplitude may be adjusted based on the sent voltage, and the process return to block 303, where the amplitude of a vibration from the vibrator is sensed.

Figure 4:
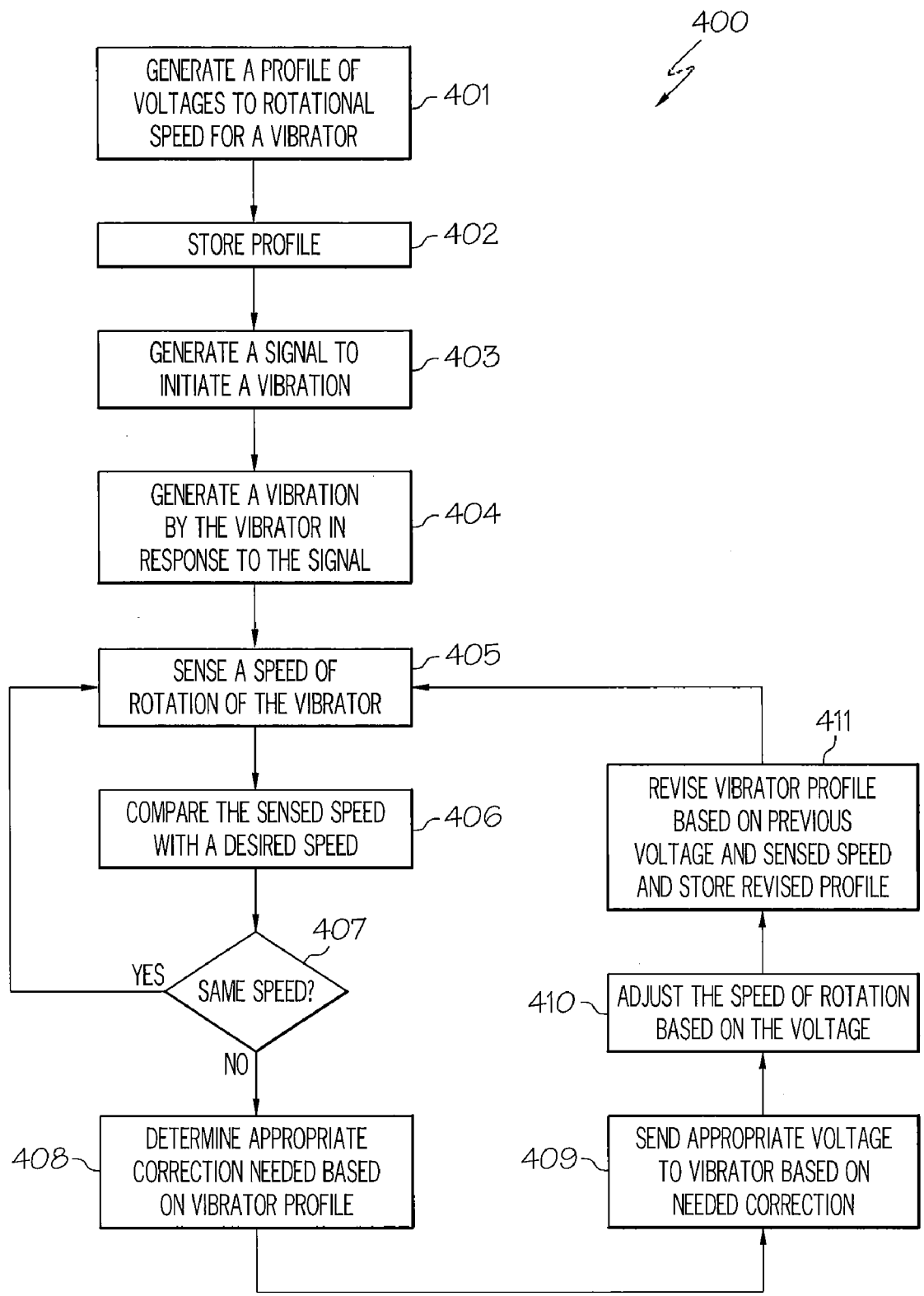
FIG. 4 is a flowchart of a process for controlling a vibrator using a calibration profile according to an example embodiment of the present invention.

FIG. 4 shows a flowchart of a process for controlling a vibrator using a calibration profile according to an example embodiment of the present invention. In the process 400, in block 401, a profile of voltages to rotational speed for a specific vibrator may be generated. The generated profile may be considered a vibrator calibration profile and may be used to determine what voltage should be supplied to the specific vibrator to achieve a desired rotational speed/vibration frequency. In block 402, the vibrator profile may be stored in a memory device. In block 403, a signal may be generated to initiate a vibration. In this regard, an incoming call may be received, a pager may receive an incoming call, a reminder regarding a calendar/schedule entry, etc. that requires a vibration to be generated from the vibrator to alert a user or holder of the mobile device of the received communication. In block 404, a vibration may be generated by the vibrator in response to the signal. In block 405, a speed of rotation/vibration frequency of the vibrator may be sensed. In block 406, the sensed speed of rotation may be compared with a desired speed. In block 407, it may be determined whether the sensed speed (i.e., vibration frequency) is the same as a desired speed (or desired vibration frequency), and if so, the process may return to block 405 where a speed of rotation of the vibrator may be sensed again.

If the sensed speed is not the same as a desired speed, as determined in block 407, in block 408 it may be determined what appropriate correction is needed based on the vibrator profile. In this regard, the sensed speed may be analyzed to see how far away it is from the desired speed and how these two map onto the existing vibrator profile. The analysis may also include determining what new voltage level may need to be supplied to the vibrator in order to achieve the desired speed. The voltage may be increased or decreased accordingly. For example, if a voltage that corresponds to the desired speed according to the profile was supplied, but the sensed speed was different, using the profile, the voltage may be adjusted. In block 409, an appropriate voltage may be sent to the vibrator based on the determined correction. In block 410, the speed of rotation (vibration frequency) may be adjusted based on the voltage. In block 411, the vibrator profile may be revised/updated based on the previous voltage and sensed speed and the revised/updated profile stored. The process may then move to block 405 where a speed of the rotation of the vibrator may be again sensed.

Figure 5:
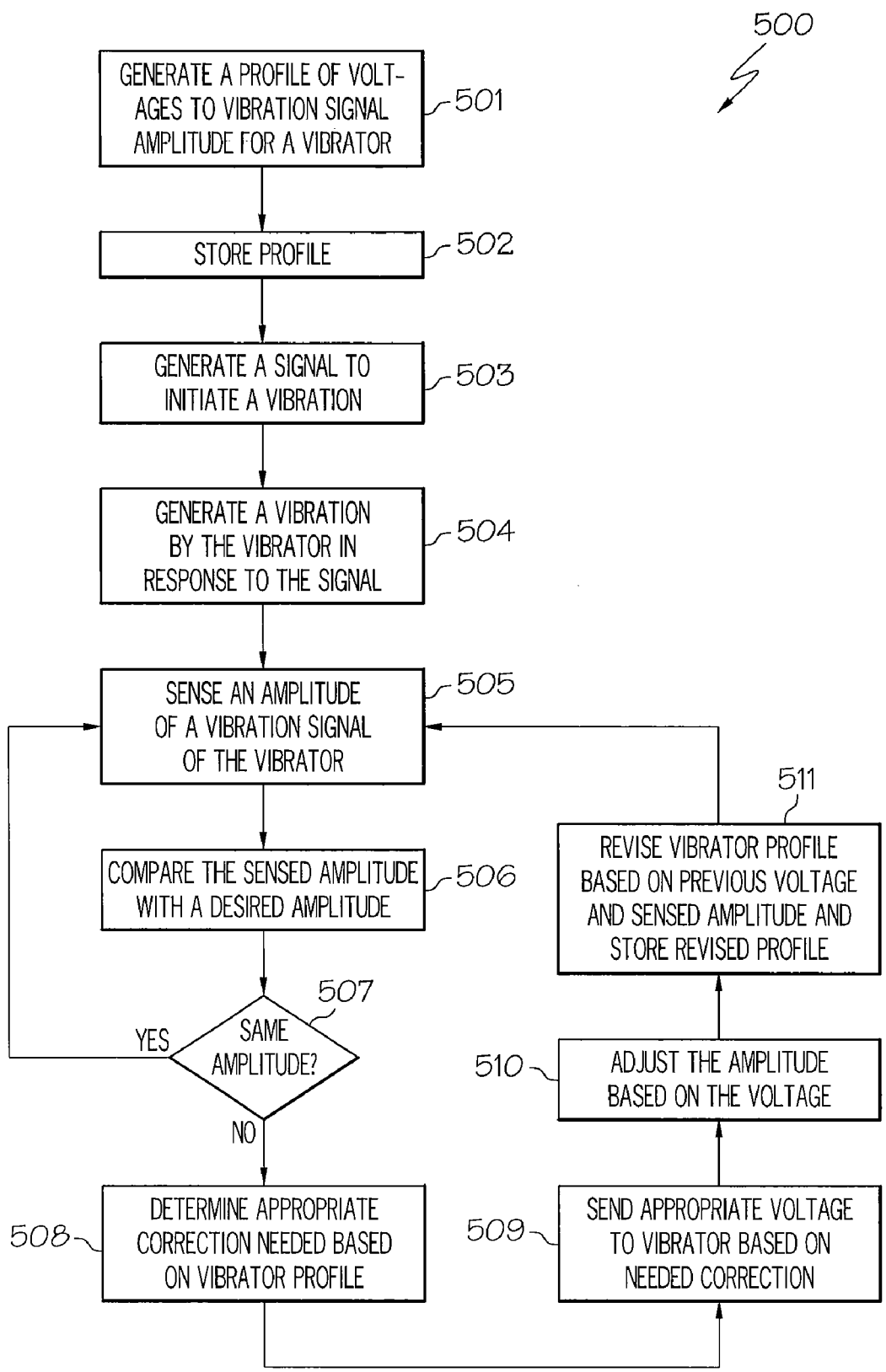
FIG. 5 is a flowchart of a process for controlling a vibrator using a calibration profile according to another example embodiment of the present invention.

FIG. 5 shows a flowchart of a process for controlling a vibrator using a calibration profile according to another example embodiment of the present invention. In the process 500, in block 501, a profile of voltages to vibration signal amplitude for a vibrator may be generated. In block 502, the profile may be stored. In block 503, a signal may be generated to initiate a vibration from a vibrator. In block 504, a vibration may be generated by the vibrator in response to the signal. In block 505, an amplitude of a vibration of the vibrator may be sensed. In block 506, the sensed amplitude may be compared with a desired amplitude. In block 507, it may be determined if the sensed amplitude is the same as the desired amplitude, and if so, the process returns to block 505 where an amplitude of a vibration of the vibrator is again sensed.

If the sensed amplitude is not the same as the desired amplitude, block 507, in block 508, an appropriate correction that is needed based on a vibrator profile may be determined. Similar to the speed of rotation correction determination, the sensed amplitude may be analyzed to determine how close or far away it is from the desired amplitude as well as what voltage was generated to produce the sensed amplitude, and then the vibrator profile used to determine what voltage should be supplied to the vibrator to produce the desired amplitude. For example, if a voltage that corresponds to the desired amplitude according to the profile was supplied, but the sensed amplitude was different, using the profile, the voltage may be adjusted. In block 509, an appropriate voltage may be sent to the vibrator based on the determined needed correction. In block 510, the amplitude may be adjusted based on the sent voltage. In block 511, the vibrator profile may be revised/updated based on the previous voltage used that produced the sensed amplitude, and the revised profile is then stored. The process may then return to block 505 where again an amplitude of a vibration of the vibrator may be sensed.

Figure 6:
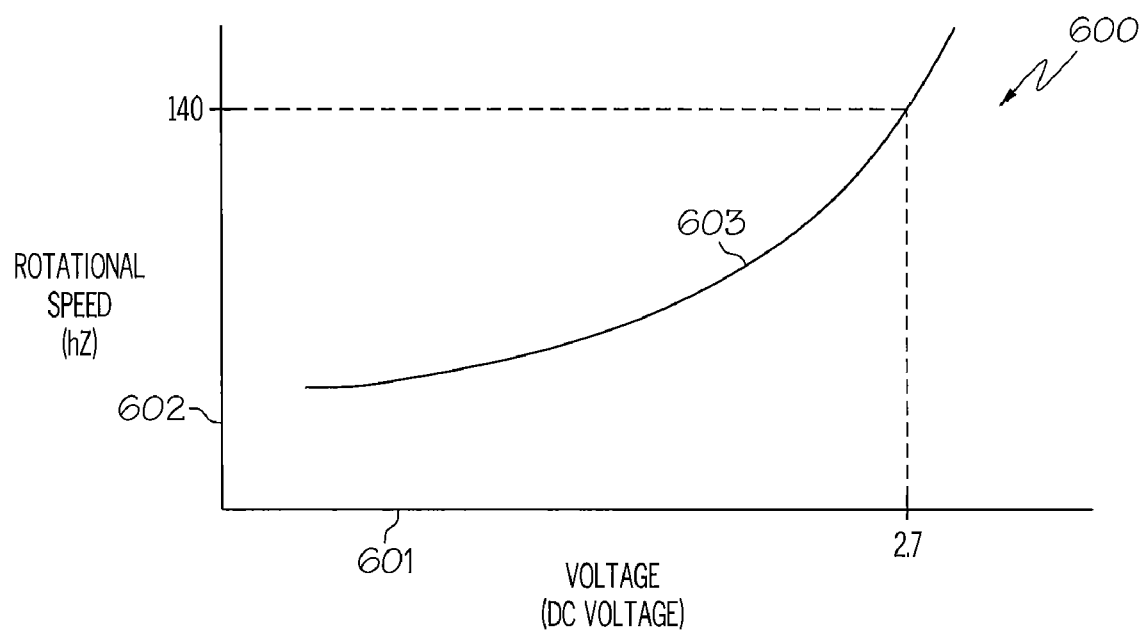
FIG. 6 is a diagram of a vibrator calibration graph according to an example embodiment of the present invention.

FIG. 6 shows a diagram of a vibrator calibration graph according to an example embodiment of the present invention. The graph 600 may include a first axis 601 that represents a voltage supplied to a vibrator and a second axis 602 that represents an associated rotational speed or vibration frequency associated with a vibration generated by the vibrator at a specific voltage based on the intersection of the vibration frequency and voltage on a vibration curve 603. The graph 600 may include one or more vibration curves. In this example embodiment, a vibrator associated with the curve 603 may produce a vibration frequency of 140 hertz when a DC voltage of 2.7 volts is supplied to the vibrator. Although not shown, other voltages and frequencies may be displayed on this graph in order to determine what voltage needs to be supplied to a vibrator in order for the vibrator to produce a certain frequency of vibration. Should, at a later time, a supplied voltage of 2.7 volts produces a different frequency than the 140 hertz, the vibration curve 603 may be updated and adjusted accordingly. Further, the graph 600 may contain multiple vibration curves where one curve may be based on actual measurements from the vibrator and the other curves based on possible or estimated future vibrator characteristic variations over time.

Figure 7:
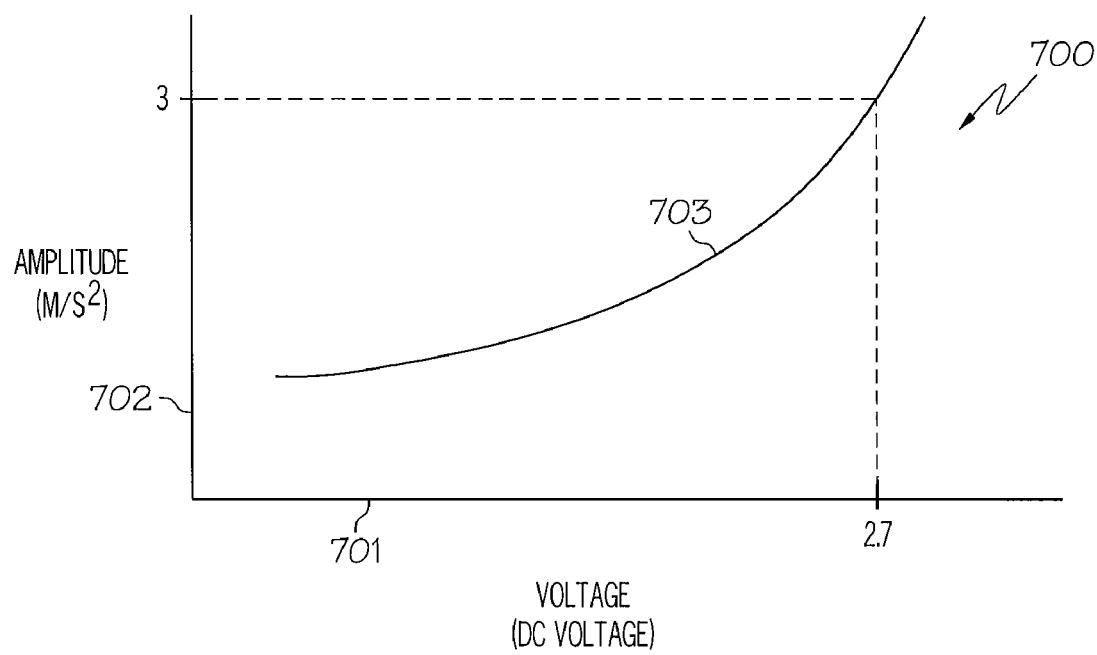
FIG. 7 is a diagram of a vibrator calibration graph according to another example embodiment of the present invention.

FIG. 7 shows a diagram of a vibrator calibration graph according to another example embodiment of the present invention. In this embodiment, a graph 700 may include one or more vibrator calibration curves 703. The graph 700 may include a first axis 701 that shows various voltages that may be supplied to a vibrator to produce specific amplitudes of a vibration signal. The graph 700 may also include a second axis 702 that shows various values of an amplitude of a vibration signal generated by a vibrator. Points on the calibration curve 703 where a specific voltage intersects with a specific amplitude denotes that this voltage may be supplied to the vibrator in order to produce this specific amplitude of the vibration signal. The calibration curve 703 may be updated where the curve looks different based on sensed amplitudes of vibrations being generated based on certain voltages supplied to the vibrator. In this example embodiment, a DC voltage of 2.7 volts being supplied to the vibrator may produce a vibration signal with an amplitude of 3 m/s$^2$ (meters/second$^2$). Should, at a later time, a supplied voltage of 2.7 volts produce a different amplitude than the 3 m/s$^2$, the vibration curve 703 may be updated and adjusted accordingly. Further, the graph 700 may contain multiple vibration curves where one curve may be based on actual measurements from the vibrator and the other curves based on possible or estimated future vibrator characteristic variations over time.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A mobile device comprising:
a vibrator, the vibrator including a drive motor and a drive circuit;
an accelerometer, the accelerometer sensing a speed of rotation of the vibrator; and
a processor configured for:
obtaining, from a vibrator calibration profile, a drive voltage corresponding to a desired rotational speed, wherein the vibrator calibration profile is a profile of voltages versus rotational speeds for the vibrator;
delivering the drive voltage to the drive circuit to produce the desired rotational speed of the vibrator;
receiving, from the accelerometer, the sensed speed of rotation of the vibrator;
comparing the sensed speed of rotation with the desired rotational speed;
in response to determining the sensed speed of rotation is different from the desired rotational speed, obtaining a correction drive voltage from the vibrator calibration profile; and
delivering the correction drive voltage to the drive circuit to adjust a current rotational speed of the vibrator to produce the desired rotational speed, wherein the correction drive voltage increases or reduces the drive voltage.

2. The mobile device according to claim 1, wherein the mobile device comprises a mobile phone.

3. The mobile device according to claim 1, wherein the processor is further configured for revising the vibrator calibration profile so that the drive voltage now corresponds to the sensed speed of rotation.

4. The mobile device according to claim 1, wherein the accelerometer continually senses the speed of rotation of the vibrator and in response, the processor obtains and delivers the drive voltage to control the drive circuit and maintain the vibrator at the desired rotational speed.

5. The mobile device according to claim 1, wherein the accelerometer senses an amplitude of a vibration produced by the vibrator, the processor configured for:
obtaining, from a second vibrator calibration profile, a second drive voltage corresponding to a desired vibration amplitude, wherein the second vibrator calibration profile is a profile of voltages versus vibration amplitudes;
delivering the second drive voltage to the drive circuit to produce the desired vibration amplitude; and
receiving, from the accelerometer, the sensed vibration amplitude of the vibrator.

6. The mobile device according to claim 5, wherein the processor is further configured for:
comparing the sensed vibration amplitude with the desired vibration amplitude;
in response to determining the sensed vibration amplitude is different from the desired vibration amplitude, obtaining a second correction drive voltage from the second vibrator calibration profile; and
delivering the second correction drive voltage to the drive circuit to adjust a current vibration amplitude to produce the desired vibration amplitude, wherein the second correction drive voltage increases or reduces the second drive voltage.

7. The mobile device according to claim 6, wherein the processor is further configured for:
revising the second vibrator calibration profile so that the second drive voltage now corresponds to the sensed vibration amplitude.

8. The mobile device according to claim 5, wherein the accelerometer continually senses the amplitude of the vibration of the vibrator and in response, the processor obtains and delivers the second drive voltage to control the drive circuit and maintain the drive motor at the desired vibration amplitude.

9. A method for controlling a vibrator in a mobile device comprising:
obtaining, from a vibrator calibration profile, a drive voltage corresponding to a desired rotational speed, wherein the vibrator calibration profile is a profile of voltages versus rotational speeds for the vibrator;
delivering the drive voltage to a drive circuit associated with the vibrator to produce the desired rotational speed of the vibrator;
receiving, from an accelerometer, a sensed speed of rotation of the vibrator;
comparing the sensed speed of rotation with the desired rotational speed;
in response to determining the sensed speed of rotation is different from the desired rotational speed, obtaining a correction drive voltage from the vibrator calibration profile; and
delivering the correction drive voltage to control the vibrator to adjust a current rotational speed of the vibrator to produce the desired rotational speed, wherein the correction drive voltage increases or reduces the drive voltage.

10. The method according to claim 9, further comprising sensing the speed of rotation using the accelerometer.

11. The method according to claim 9, further comprising revising the vibrator calibration profile so that the drive voltage now corresponds to the sensed speed of rotation.

12. The method according to claim 9, further comprising
obtaining, from a second vibrator calibration profile, a second drive voltage corresponding to a desired vibration amplitude, wherein the second vibrator calibration profile is a profile of voltages versus vibration amplitudes;
delivering the second drive voltage to the drive circuit to produce the desired vibration amplitude;
receiving, from the accelerometer, the sensed vibration amplitude of the vibrator
comparing the sensed vibration amplitude with the desired vibration amplitude;
in response to determining the sensed vibration amplitude is different from the desired vibration amplitude, obtaining a second correction drive voltage from the second vibrator calibration profile; and
delivering the second correction drive voltage to the drive circuit to adjust a current vibration amplitude to produce the desired vibration amplitude, wherein the second correction drive voltage increases or reduces the second drive voltage.

13. The method according to claim 12, further comprising revising the second vibrator calibration profile so that the drive voltage now corresponds to the sensed vibration amplitude.

14. A mobile device comprising:
a vibrator, the vibrator including a drive motor and a drive circuit;
a sensor, the sensor sensing an amplitude of vibration of the vibrator; and a processor configured for:
  obtaining, from a vibrator calibration profile, a drive voltage corresponding to a desired vibration amplitude, wherein the vibrator calibration profile is a profile of voltages versus vibration amplitudes;
  delivering the drive voltage to the drive circuit to produce the desired vibration amplitude;
  receiving, from the sensor, the sensed vibration amplitude of the vibrator;
  comparing the sensed vibration amplitude with the desired vibration amplitude;
  in response to determining the sensed vibration amplitude is different from the desired vibration amplitude, obtaining a correction drive voltage from the vibrator calibration profile; and
  delivering the correction drive voltage to the drive circuit to adjust a current vibration amplitude to produce the desired vibration amplitude, wherein the correction drive voltage increases or reduces the drive voltage.

15. The mobile device of claim 14, wherein the processor is further configured for:
  revising the vibrator calibration profile so that the drive voltage now corresponds to the sensed vibration amplitude.

* * * * *